United States Patent
Aikawa

[11] Patent Number: 5,946,133
[45] Date of Patent: Aug. 31, 1999

[54] FOCUSING APPARATUS FOR AN OPTICAL APPARATUS

[75] Inventor: Yasuyuki Aikawa, Kawasaki, Japan

[73] Assignee: Nikon Corporation, Tokyo, Japan

[21] Appl. No.: 09/050,420

[22] Filed: Mar. 31, 1998

[30] Foreign Application Priority Data

Apr. 3, 1997 [JP] Japan ................................. 9-084948

[51] Int. Cl.$^6$ .............................. G02B 21/00; G02B 7/02
[52] U.S. Cl. ........................ 359/383; 359/368; 359/825
[58] Field of Search ........................... 359/368, 382–383, 359/391–394, 425, 694–705, 819, 821, 823–825

[56] References Cited

U.S. PATENT DOCUMENTS

| | | | |
|---|---|---|---|
| 4,003,628 | 1/1977 | Halperin | 359/392 |
| 4,616,517 | 10/1986 | Esamy | 359/383 |
| 5,121,655 | 6/1992 | Toshimitsu | 359/392 |
| 5,655,419 | 8/1997 | Aoki | 359/383 |
| 5,689,366 | 11/1997 | Sakamoto | 359/383 |
| 5,841,576 | 11/1998 | Aikawa | 359/383 |

Primary Examiner—Thong Nguyen

[57] ABSTRACT

A focusing apparatus for an optical apparatus comprises an operating member having a rotary shaft and an operating handle for rotating the rotary shaft, a support member provided with a bearing member and supporting a lens barrel having the focusing optical system of the optical apparatus and also rotatably supporting the rotary shaft of the operating member through the bearing member, a guide member engaged with the rotary shaft to move the support member in a predetermined direction with the rotation of the operating handle, and a rotational couple adjusting member disposed between the bearing member and the operating handle for adjusting the rotational couple of the operating handle.

7 Claims, 4 Drawing Sheets

FOCUSING APPARATUS FOR AN OPTICAL APPARATUS

The entire disclosure of Japanese Patent Application No. 9-084948 including the specification, claims, drawings and summary is incorporated herein by reference.

BACKGROUND OF THE INVENTION

1. Field of the Invention

This invention relates to a focusing apparatus for an optical apparatus, and more particularly to a focusing apparatus for moving the observation member of an optical apparatus to focus it on an object.

2. Related Background Art

In a moving apparatus for focusing according to the prior art, there has been proposed a focusing apparatus, i.e., a lens barrel moving mechanism, as shown, for example, in FIGS. 3 and 4 of the accompanying drawings. The prior art will hereinafter be described with reference to FIGS. 3 and 4.

In FIGS. 3 and 4, a microscope body 1 is provided with a microscope body portion 2 including an optical system necessary for observation, a stand 3 and a lens barrel moving mechanism 4 which is a focusing apparatus.

The microscope body portion 2 has a lens barrel case 7 in which there are provided an eyepiece unit 8, an objective lens unit 9 and an illuminating device 10. A transparent plate (e.g. an acryl plate) 11 is mounted in the direction of illumination of the illuminating device 10. The illuminating device 10 can illuminate a specimen, not shown, placed on the stand 3 through the transparent plate 11. The turning on and off of the illumination is effected by operating a switch 12.

A hollow shaft 13 is fixed to that side 2a of the microscope body portion 2 which is adjacent to the lens barrel moving mechanism. The hollow shaft 13 is rotatably held by a bearing (not shown) provided in the front side holding case 41 of the lens barrel moving mechanism 4. A disc member 16 having a diameter larger than the diameter of the bearing is fixed to that end surface of the hollow shaft 13 which faces the inside of the front side holding case 41. The hollow shaft 13 and the disc member 16 are fixed to the side 2a of the microscope body portion 2 at three locations on a phantom circumference by three screws 17. Thereby, the microscope body portion 2 can be rotated about the axis of the hollow shaft 13. The microscope body portion 2 and the disc member 16 are connected together so as to sandwich the vicinity of the bearing of the front side holding case 41 from the opposite sides thereof and therefore, it never happens that when the microscope body portion 2 is rotated, the hollow portion 13 axially deviates. Also, during the microscopy and containment of the microscope, the microscope can be fixed at a predetermined position by a positioning mechanism (not shown).

The lens barrel moving mechanism 4 has a holding case comprising the front side holding case 41 and a rear side holding case 42, a guide plate 27 vertically fixed to the stand 3, and an operating handle 43 (in FIG. 3, a rotary shaft 44 to which the operating handle 43 is fixed and a rubber roller 30 are shown in cross-section).

The rubber roller 30 is mounted on the rotary shaft 44. A resin plate 28 contacting with the rubber roller 30 is secured to the guide plate 27. Also, a resin plate 34 contacting with the back of the guide plate 27 is secured to the inner side of the rear side holding case 42. That surface of the resin plate 28 which contacts with the rubber roller 30 is knurled.

The lens barrel moving mechanism 4 is further provided with bearing members 45a and 45b for rotatably holding the opposite end portions of the rotary shaft 44, an adjusting screw 35 screwed into the front side holding case 41, and a U-shaped pressing member 33 curved in conformity with the configuration of the rubber roller 30. Through-holes 36a and 36b are formed in the opposite sides of the holding case. The bearing member 45a is inserted in the through-hole 36a while overlapping the end portion 33a of the pressing member 33. Also, the bearing member 45b is inserted in the through-hole 36b while overlapping the end portion 33b of the pressing member 33. Each of the through-holes 36a and 36b is a plot slightly extending in a direction orthogonal to the guide plate 27 and guides the opposite end portions of each bearing member and the pressing member 33 in said direction.

The central portion of the back of the pressing member 33 is always pressed by the adjusting screw 35, and the bearing members 45a and 45b are pushed into the guide plate 27 side along the respective through-holes by the opposite end portions of the pressing member 33. A force resulting from this is applied to the rotary shaft 44 held by these bearing members and presses the rubber roller 30 against the resin plate 28. By the adjusting screw 35 pressing the pressing member 33, the resin plate 34 of the rear side holding case 42 is also pressed against the back of the guide plate 27.

Since a force is acting on each member as described above, a predetermined frictional force is created between the rubber roller 30 and the resin plate 28 and between the back of the guide plate 27 and the resin plate 34. Accordingly, when the operating handle 43 is rotated, the rubber roller 30 is moved along the resin plate 28 in conformity with the direction of rotation of the operating handle 43, and therewith, the front side holding case 41 and the rear side holding case 42 themselves holding the operating handle 43 are also moved.

That is, if the operating handle 43 is rotatively operated to vertically move the microscope body portion 2, the focus adjustment of the specimen placed on the stand 3 can be effected.

When it is desired to adjust the aforementioned frictional force, the adjusting screw 35 is operated. If, for example, it happens that as the present stereomicroscope is used for many years, the rubber roller 30 idly rotates relative to the resin plate 28, the adjusting screw 35 is rotated in a predetermined direction and screwed in to thereby bring the pressing member 33 close to the guide plate 27. Thereby, the previous frictional force can be revived.

When conversely, the operating handle 43 is stiff, the adjusting screw 35 is rotated in the opposite direction and moved in a direction to be pulled out, thereby keeping the pressing member 33 away from the guide plate 27. If this is done, the aforementioned frictional force will be decreased and the operating handle 43 will become light.

In such prior art, the lens barrel moving mechanism sandwiches the guide plate between the rear side holding case and the rotary shaft by the use of simple members such as the resin plate, the rubber roller, the pressing member and the adjusting screw. The sandwiched guide plate makes frictional contact by the contact of the resin plate it has with the rubber roller mounted on the rotary shaft and the engagement thereof with the resin plate the rear side holding case has. By such a simple construction, it is made possible to obtain a frictional force easily and the movement of the microscope body portion is reliably effected.

However, there has been the problem that if in an actual state of use, the cumulative frequency of the movement of the microscope body portion by many years of use becomes enormous, the contact pressure decreases and the operating bundle becomes light. At such a time, the adjusting screw can be rotated in a predetermined direction and screwed in and the pressing member can be brought close to the guide plate to thereby revive the previous frictional force, but there arises the necessity of avoiding such work as far as possible. In the prior art, however, the construction is simpler and this has limited the durability thereof.

SUMMARY OF THE INVENTION

The present invention has been made in view of such a problem peculiar to the prior art and an object thereof is to provide a lens barrel moving mechanism, i.e., a focusing apparatus excellent in durability in which even when the cumulative frequency of the movement of a microscope body portion by many years of use becomes enormous, the contact pressure does not decrease and the rotational couple of an operating handle is kept constant, whereby it is made possible to reliably effect the movement of the microscope body portion.

To achieve the above object, according to a first aspect of the present invention, there is provided a focusing apparatus for an optical apparatus, comprising an operating member having a rotary shaft and an operating handle for rotating the rotary shaft, a support member provided with a bearing member and supporting a lens barrel having the focusing optical system of the optical apparatus and also rotatably supporting the rotary shaft of the operating member through the bearing member, a guide member engaged with the rotary shaft to move the support member in a predetermined direction with the rotation of the operating handle, and a rotational couple adjusting member disposed between the bearing member and the operating handle for adjusting the rotational couple of the operating handle.

Preferably, the bearing member has its first surface orthogonal to the rotary shaft formed on the operating handle side, the operating handle has its second surface opposed to the first surface formed, and the rotational couple adjusting member is sandwiched between the first surface and the second surface.

The rotational couple adjusting member preferably has a first couple adjusting ring formed with a first engagement surface engaged with the first surface, a second couple adjusting ring formed with a second engagement surface engaged with the second surface and an elastic member sandwiched between the first couple adjusting ring and the second couple adjusting ring. In this case, it is preferable that at least one of the first engagement surface and the second engagement surface be a smooth sliding surface.

According to a second aspect of the present invention, there is provided a focusing apparatus for an optical apparatus, comprising an operating member having a rotary shaft and an operating handle for rotating the rotary shaft, a support member provided with a bearing member and supporting a lens barrel having the focusing optical system of the optical apparatus and also rotatably supporting the rotary shaft of the operating member through the bearing member, a guide member having a contact surface contacting with the rotary shaft and moving the support member in a predetermined direction with the rotation of the operating handle by a frictional force created between the rotary shaft and the contact surface, a frictional force adjusting mechanism for adjusting the frictional force, and a rotational couple adjusting member disposed between the bearing member and the operating handle for adjusting the rotational couple of the operating handle.

The above and other objects, features and advantages of the present invention will be explained hereinafter and may be better understood by reference to the drawings and the descriptive matter which follows.

DESCRIPTION OF THE PREFERRED EMBODIMENT

Figure 1:
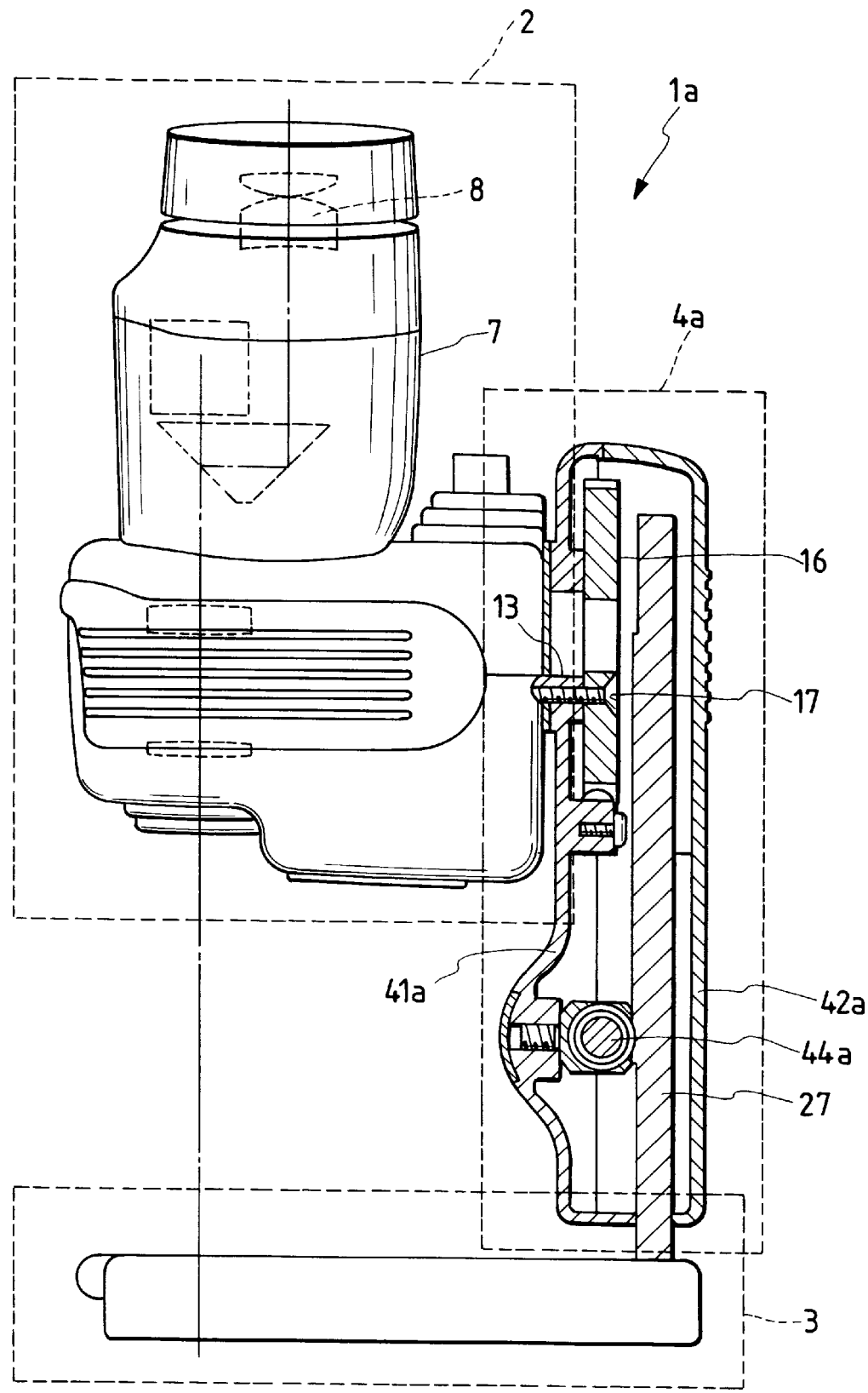
FIG. 1 is a side view, partly in cross-section, of a stereomicroscope in which a focusing apparatus according to the present invention is incorporated.
Figure 2:
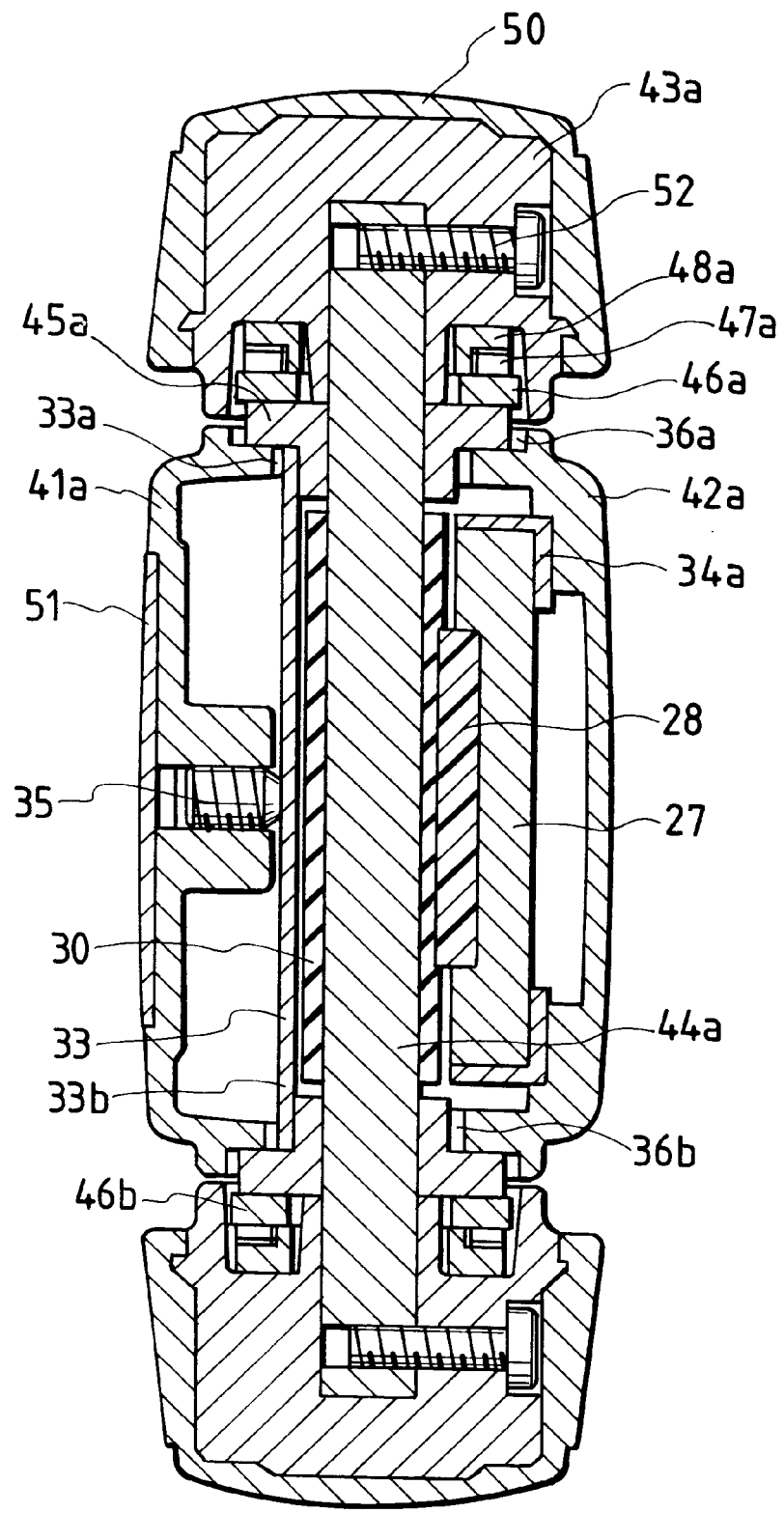
FIG. 2 is a cross-sectional view of the essential portions of the focusing apparatus according to the present invention.
Figure 3:
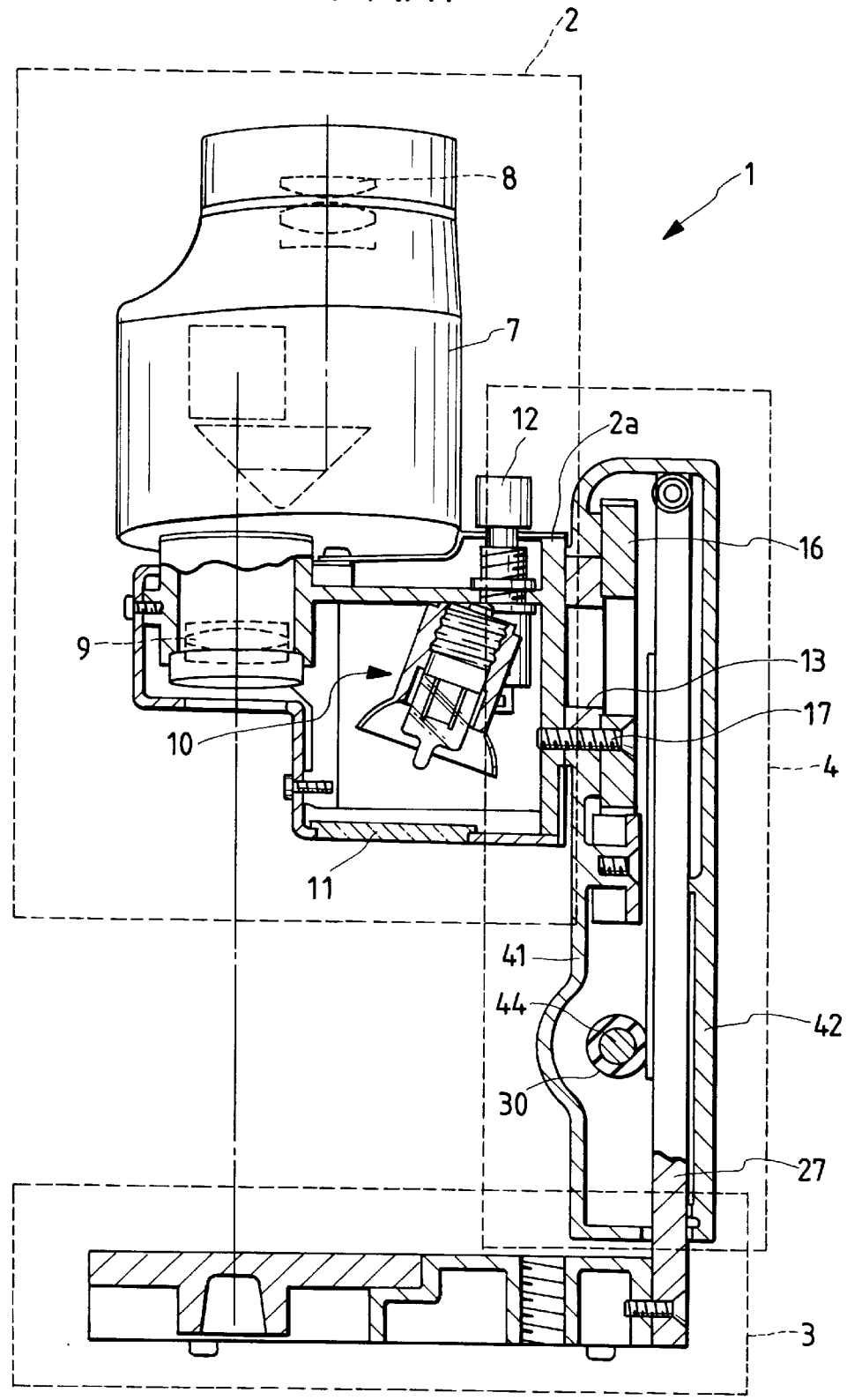
FIG. 3 is a side view, partly in cross-section, of a stereomicroscope in which a focusing apparatus according to the prior art is incorporated.
Figure 4:
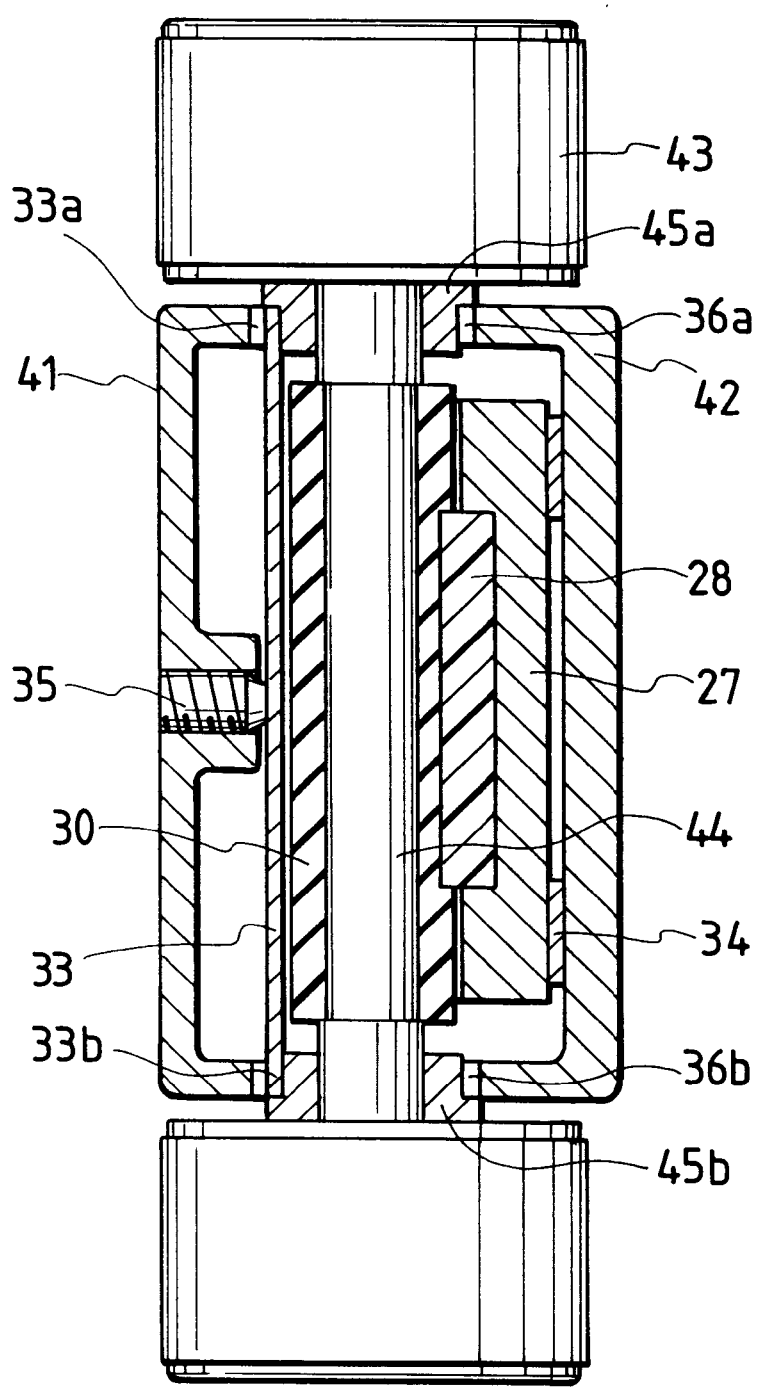
FIG. 4 is a cross-sectional view of the essential portions of the focusing apparatus according to the prior art.
Figure 2:
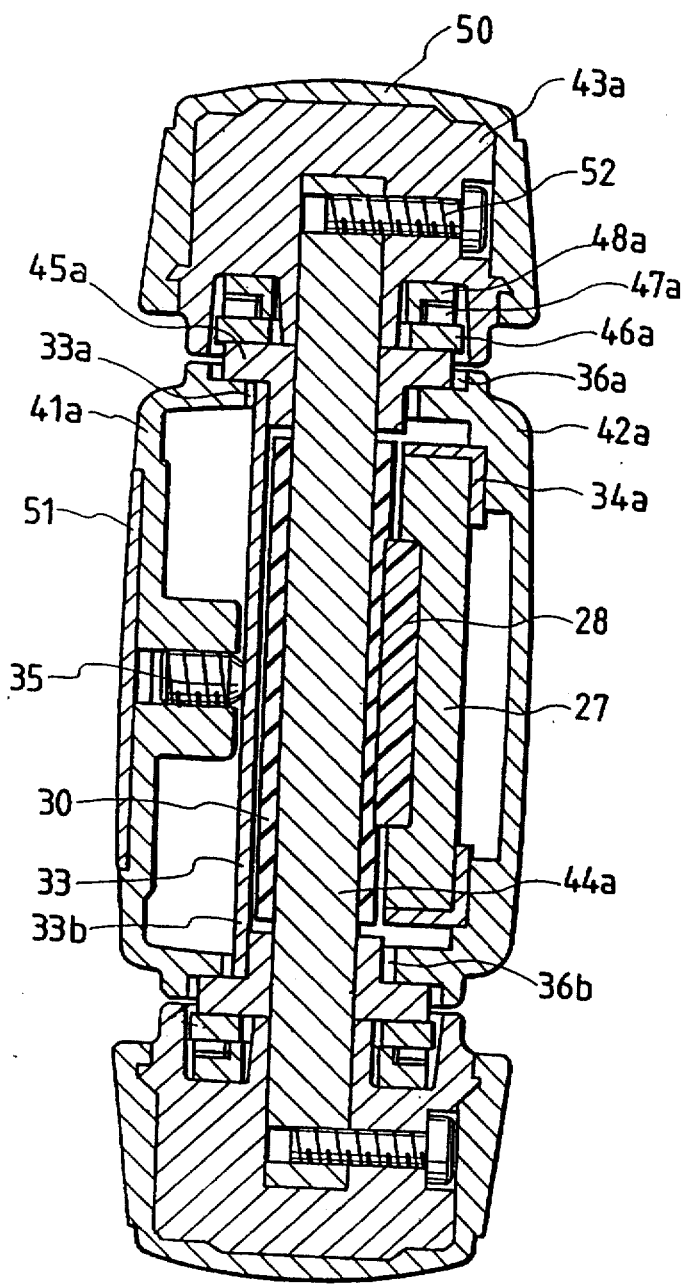

Referring to FIGS. 1 and 2, a stereomicroscope 1a according to the present invention is provided with a microscope body portion 2 including an optical system necessary for observation, a stand 3 and a lens barrel moving mechanism 4a which is a focusing apparatus. The stereomicroscope 1a according to the present invention thus constructed is similar to the stereomicroscope according to the prior art shown in FIG. 3 except a portion of the lens barrel moving mechanism 4a and therefore, in order to avoid the duplication of description, corresponding portions are given like reference characters and need not be described.

A front side holding case 41a and a rear side holding case 42a which are the body cases of the lens barrel moving mechanism 4a are combined together to thereby constitute a holding case. The lens barrel moving mechanism 4a is provided with a cover 51 on the front side holding case 41a for the purpose of improvement, and is somewhat changed in the shape of a resin plate 34a.

The both sides of the holding case are formed with laterally long through-holes 36a and 36b which are supporting portions for a bearing member 45a, which is supported for movement only in a longitudinal direction. A rotary shaft 44a is rotatably fitted to the bearing member 45a, and an operating handle 43a is secured to the opposite end portions thereof by screws 52. The operating handle 43a is covered with an operating handle rubber cover 50 to improve the external appearance and operability thereof.

The operating handle 43a has an opposed portion opposed to the end surface thereof orthogonal to the axis thereof which is formed on that side of the bearing member 45a which is adjacent to the operating handle 43a. The opposed portion of the operating handle 43a is formed with a circular ring-shaped holding groove for holding a rotational couple adjusting member. This holding groove has its bottom made into a flat surface, which is opposed to the end surface of the bearing member 45a.

A couple adjusting ring 48a having an L-shaped cross-section, a wave washer 47a and a planar couple adjusting ring 46a are inserted in the holding groove in succession from the bottom. The planar couple adjusting ring 46a has its one surface worked into a smooth surface, and this surface is engaged with the end surface of the bearing member 45a. Also, the couple adjusting ring 48a having an L-shaped cross-section, like the couple adjusting ring 46a, has its one surface worked into a smooth surface, which is engaged with the bottom of the holding groove formed in the operating handle 43a. The two couple adjusting rings 46a and 48a are members formed of a metal, e.g. iron, and the wave washer 47a is sandwiched between the other surfaces of the couple adjusting rings and therefore, the couple adjusting ring 46a receives the biasing force of the wave washer 47a and presses the end surface of the bearing member 45a, and the couple adjusting ring 48a presses the bottom of the holding groove. Accordingly, the operating handle 43a can obtain a rotational couple which can reliably move the microscope body portion 2.

The wave washer 47a has the irregularity of shape attributable to a working method therefor. Therefore, the rotational couple of individual operating handles 43a varies. Basically, if the amount of variation is within an allowable range, the rotational couple can be intactly used, but if the amount of variation exceeds the allowable range, the adjustment of the rotational couple is required. The adjustment of the rotational couple is possible by preparing couple adjusting rings 48a having different thicknesses, and selecting an appropriate one from among them and interchanging it.

According to the embodiment of the present invention, the rotational couple of the operating handle 43a is adjustable by the operating handle 43a secured to the rotary shaft 44a, the bearing member 45a and a rotational couple adjusting member sandwiched therebetween. Since a construction is thus added, the movement of the stereomicroscope 1a can be reliably effected by the couple adjustment only in the rotary shaft portion by a simple rotational couple adjusting member.

The rotational couple adjusting member according to the present invention displays the function as the rotational couple adjusting member of the focusing apparatus by a simple construction as described above, and also displays its power from the viewpoint of the contact pressure between the rotary shaft 44a and the guide member.

That is, as regards the main rotational couple of the operating handle 43a, the rotational couple of the operating handle 43a is maintained by the operating handle 43a secured to the rotary shaft 44a, the bearing member 45a and the rotational couple adjusting member sandwiched therebetween and therefore, unlike the focusing apparatus according to the prior art, the contact pressure between a rubber roller 30 covering the rotary shaft 44a and a resin plate 28 secured to a guide plate 27 is sufficient if it is necessary minimum contact pressure of such a degree that the rotary shaft does not idly rotate. As the result, the progress of the wear of the rubber roller 30, the resin plate 28 and the resin plate 34a becomes very slow and the deformation thereof by the pressing force can be minimized. Accordingly, the durability of each member pressed by an adjusting screw 35 through a pressing member 33 is improved.

On the other hand, description will now be made of the wear of the rotational couple adjusting member in the adjustment of the rotational couple in the portion of the operating handle 43a.

The wave washer 47a and the couple adjusting rings 46a and 48a sandwiching it therebetween are all formed of a metallic material and therefore it is relatively difficult for these to wear. In addition, the surface of contact of the couple adjusting ring 46a with the bearing member 45a and the surface of contact of the couple adjusting ring 48a with the bottom of the holding groove of the operating handle are finished into smooth surfaces. Accordingly, they are worked into a state in which it is difficult for them to wear. The thus worked couple adjusting rings 46a and 48a hardly wear, and do not wear even the surfaces frictionally contacted by the surfaces thereof. Consequently, the adjustment of the rotational couple excellent in durability in the portion of the operating handle 43a is made possible.

In the present invention, the following improvements are derived in addition to the above-described improvements.

As regards the adjustment of the rotational couple in the portion of the operating handle 43a, the thickness of the couple adjusting ring 48a is changed to thereby correct the irregularity of the dimension of the wave washer 47a. To reliably effect this adjustment of the couple, it is necessary to prepare many kinds of couple adjusting rings differing in thickness or re-work them so as to match individually. In the present invention, however, provision is made of a construction for adjusting the rotational force by a frictional force adjusting mechanism, i.e., the adjusting screw 35, and therefore the fine adjustment of the couple is possible by the frictional force adjusting mechanism. Accordingly, the adjustment of the couple in the portion of the operating handle 43a may be rough adjustment and therefore, it becomes unnecessary to prepare many kinds of couple adjusting rings. Consequently, not only the number of parts can be curtailed, but also the working property is markedly improved.

While in the above-described embodiment, the wave washer 47a is used as a member for giving a biasing force to the couple adjusting rings 46a and 48a, this is not restrictive, but of course, use may also be made, for example, of a compression spring, a resilient plate member or the like.

As described above, according to the present invention, a very simple couple adjusting member for adjusting the rotational couple of the operating handle is disposed between the bearing member supporting the rotary shaft and the operating handle and therefore, even when the cumulative frequency of the movement of the microscope body portion by many years of use becomes enormous, there is achieved the effect that the contact pressure with the rotary shaft does not decrease and the rotational couple of the operating handle is kept constant.

There is also the advantage that the adjustment of the rotational couple of the operating handle by the rotational couple adjusting member may be rough and this contributes to the curtailment of the number of parts and the improvement in the working property.

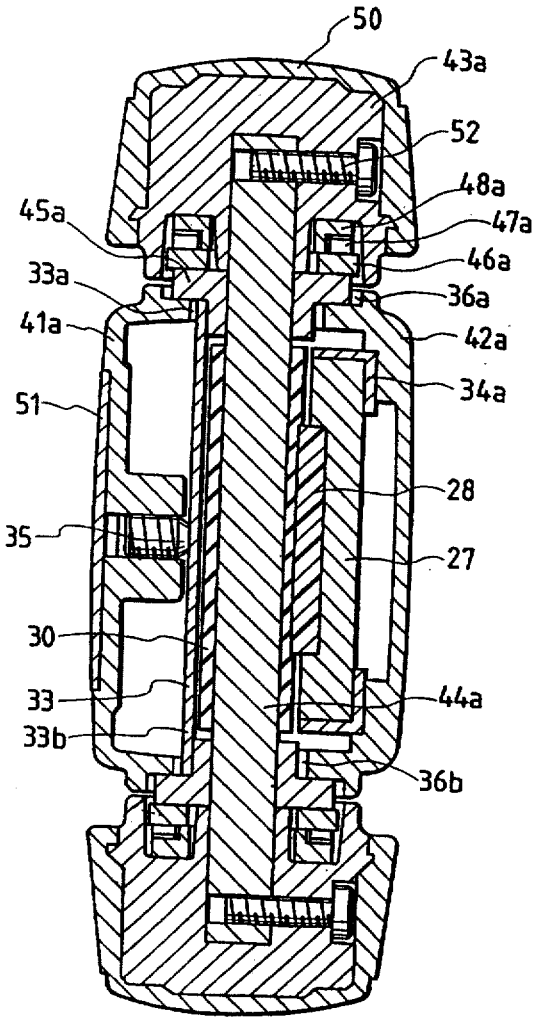

What is claimed is:

1. A focusing apparatus for an optical apparatus, comprising:

an operating member having a rotary shaft and an operating handle to rotate said rotary shaft;

a support member including a bearing member and supporting a lens barrel having a focusing optical system of said optical apparatus and also rotatably supporting the rotary shaft of said operating member through said bearing member;

a guide member engaged with said rotary shaft to move said support member in a predetermined direction with the rotation of said operating handle; and a rotational couple adjusting member disposed between said bearing member and said operating handle to adjust a rotational couple of said operating handle, wherein said bearing member includes a first surface orthogonal to said rotary shaft, said operating handle includes a second surface opposed to said first surface, and said rotational couple adjusting member is sandwiched between said first surface and said second surface, and wherein said rotational couple adjusting member has a first couple adjusting ring formed with a first engagement surface engaged with said first surface, a second couple adjusting ring formed with a second engagement surface engaged with said second surface, and an elastic member sandwiched between said first couple adjusting ring and said second couple adjusting ring.

2. The focusing apparatus of claim 1, wherein at least one of said first engagement surface and said second engagement surface is a smooth sliding surface.

3. The focusing apparatus of claim 1, wherein said elastic member is a wave washer.

4. The focusing apparatus of claim 1, wherein said optical apparatus is a stereomicroscope.

5. The focusing apparatus of claim 1, wherein said lens barrel is rotatably supported by said support member.

6. A focusing apparatus for an optical apparatus, comprising:

an operating member having a rotary shaft and an operating handle for rotating said rotary shaft;

a support member provided with a bearing member and supporting a lens barrel having a focusing optical system of the optical apparatus and also rotatably supporting the rotary shaft of said operating member through said bearing member;

a guide member having a contact surface contacting said rotary shaft and moving said support member in a predetermined direction with rotation of said operating handle by a frictional force created between said rotary shaft and said contact surface;

a rotational couple adjusting member disposed between said bearing member and said operating handle to roughly adjust a rotational couple of said operating handle; and a frictional force adjusting mechanism to complement a shortage of the rotational couple which is roughly adjusted with said rotational couple adjusting member and to finely adjust said frictional force.

7. The focusing apparatus of claim 6, wherein said bearing member includes a first surface orthogonal to said rotary shaft formed on an operating handle side, said operating handle includes a second surface opposed to said first surface, said rotational couple adjusting member has a first couple adjusting ring formed with a first engagement surface engaged with said first surface, a second couple adjusting ring formed with a second engagement surface engaged with said second surface, and an elastic member sandwiched between said first couple adjusting ring and said second couple adjusting ring.

* * * * *

UNITED STATES PATENT AND TRADEMARK OFFICE
CERTIFICATE OF CORRECTION

PATENT NO. : 5,946,133
DATED : August 31, 1999
INVENTOR(S) : Yasuyuki Aikawa

It is certified that error appears in the above-identified patent and that said Letters Patent is hereby corrected as shown below:

The title page, showing the illustrative figure, should be deleted and substitute therefor the attached title page.

Drawing sheet, consisting of Fig. 2, should be deleted to be replaced with the drawing sheet, consisting of Fig. 2, as shown on the attached page.

Signed and Sealed this

First Day of February, 2000

*Attest:*

Q. TODD DICKINSON

*Attesting Officer*  *Acting Commissioner of Patents and Trademarks*

United States Patent [19]

Aikawa

[11] Patent Number: 5,946,133
[45] Date of Patent: Aug. 31, 1999

[54] FOCUSING APPARATUS FOR AN OPTICAL APPARATUS

[75] Inventor: Yasuyuki Aikawa, Kawasaki, Japan

[73] Assignee: Nikon Corporation, Tokyo, Japan

[21] Appl. No.: 09/050,420

[22] Filed: Mar. 31, 1998

[30] Foreign Application Priority Data

Apr. 3, 1997 [JP] Japan ................... 9-084948

[51] Int. Cl.⁶ ............... G02B 21/00; G02B 7/02
[52] U.S. Cl. ................... 359/383; 359/368; 359/825
[58] Field of Search ............... 359/368, 382–383, 359/391–394, 425, 694–705, 819, 821, 823–825

[56] References Cited

U.S. PATENT DOCUMENTS

| | | |
|---|---|---|
| 4,003,628 | 1/1977 | Halperin ................... 359/392 |
| 4,616,517 | 10/1986 | Esamy ................... 359/383 |
| 5,121,655 | 6/1992 | Toshimitsu ................... 359/392 |
| 5,655,419 | 8/1997 | Aoki ................... 359/383 |
| 5,689,366 | 11/1997 | Sakamoto ................... 359/383 |
| 5,841,576 | 11/1998 | Aikawa ................... 359/383 |

*Primary Examiner*—Thong Nguyen

[57] ABSTRACT

A focusing apparatus for an optical apparatus comprises an operating member having a rotary shaft and an operating handle for rotating the rotary shaft, a support member provided with a bearing member and supporting a lens barrel having the focusing optical system of the optical apparatus and also rotatably supporting the rotary shaft of the operating member through the bearing member, a guide member engaged with the rotary shaft to move the support member in a predetermined direction with the rotation of the operating handle, and a rotational couple adjusting member disposed between the bearing member and the operating handle for adjusting the rotational couple of the operating handle.

7 Claims, 4 Drawing Sheets